US010296271B2

(12) United States Patent
Watanabe et al.

(10) Patent No.: US 10,296,271 B2
(45) Date of Patent: May 21, 2019

(54) IMAGE FORMING APPARATUS AND PAGE ORDER CHANGING PROGRAM

(71) Applicant: Konica Minolta, Inc., Chiyoda-ku, Tokyo (JP)

(72) Inventors: Wataru Watanabe, Tokyo (JP); Shota Sakurai, Tokyo (JP); Tatsuya Furuta, Tokyo (JP); Kazuteru Ishizuka, Saitama (JP); Hiroshi Morimoto, Tokyo (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 15/583,116

(22) Filed: May 1, 2017

(65) Prior Publication Data
US 2017/0337017 A1  Nov. 23, 2017

(30) Foreign Application Priority Data

May 17, 2016 (JP) ................... 2016-098750

(51) Int. Cl.
G06F 3/12 (2006.01)
G03G 15/00 (2006.01)
G06K 15/14 (2006.01)
G06K 15/02 (2006.01)
G06K 15/12 (2006.01)

(52) U.S. Cl.
CPC ............ *G06F 3/125* (2013.01); *G03G 15/50* (2013.01); *G03G 15/5025* (2013.01); *G03G 15/55* (2013.01); *G06F 3/1208* (2013.01); *G06K 15/129* (2013.01); *G06K 15/14* (2013.01); *G06K 15/1868* (2013.01); *G06K 15/1872* (2013.01); *G06F 3/121* (2013.01); *G06F 3/1244* (2013.01)

(58) Field of Classification Search
CPC ........ G06F 3/125; G06F 3/1208; G06F 3/121; G06F 3/1244; G03G 15/50; G06K 15/129; G06K 15/14; G06K 15/1868; G06K 15/1872
USPC ................. 358/3.26, 1.9, 1.15; 382/112, 162
See application file for complete search history.

(56) References Cited

U.S. PATENT DOCUMENTS

2003/0103236 A1* 6/2003 Kato ..................... G06F 3/1204
                                                              358/1.15
2006/0110009 A1* 5/2006 Klassen .................. G06T 7/001
                                                              382/112

FOREIGN PATENT DOCUMENTS

JP      2011-002577 A      1/2011
JP      2011-154270 A      8/2011

* cited by examiner

Primary Examiner — Quang N Vo
(74) Attorney, Agent, or Firm — Squire Patton Boggs (US) LLP

(57) ABSTRACT

An image forming apparatus includes: a determination section configured to determine whether there is a possibility of generation of an image defect during a printing job for image formation on a plurality of pages based on image data included in the printing job; and a changing section configured to change an order of the pages to be subjected to image formation such that an image defect is not generated when the determination section determines that there is a possibility of generation of the image defect.

20 Claims, 9 Drawing Sheets

IMAGE FORMING APPARATUS AND PAGE ORDER CHANGING PROGRAM

CROSS REFERENCE TO RELATED APPLICATIONS

The entire disclosure of Japanese Patent Application No. 2016-098750, filed on May 17, 2016, including description, claims, drawings and abstract are incorporated herein by reference in its entirety.

BACKGROUND OF THE INVENTION

1. Field of the Invention

The present invention relates to an image forming apparatus and a page order changing program.

2. Description of Related Art

In general, an electrophotographic image forming apparatus (such as a printer, a copy machine, and a fax machine) is configured to irradiate (expose) a charged photoconductor drum (image bearing member) with (to) laser light based on image data to form an electrostatic latent image on the surface of the photoconductor. The electrostatic latent image is then visualized by supplying toner from a developing device to the photoconductor drum on which the electrostatic latent image is formed, whereby a toner image is formed. Further, the toner image is directly or indirectly transferred to a sheet, and then heat and pressure are applied to the sheet at a fixing nip to form a toner image on the sheet.

SUMMARY OF THE INVENTION

Incidentally, various image defects are generated during image formation. It has been confirmed that the frequency of generation of image defects increases under a certain image formation condition among the conditions which generates various image defects.

An example of such an image formation condition is an image formation condition in which high coverage pages are successively processed. Under such an image formation condition, the frequency of supply of the toner in the developing device increases, and consequently the charging distribution of the toner in the developing device tends to be unstable. One reason for this is that, the supplied toner is mixed with the charged toner in the developing device without being sufficiently charged. When the proportion of the toner whose charge amount is small increases in the developing device, toner scattering and the like easily occur. When the toner scattering amount increases, the toner accumulation amount in the image forming apparatus also increases, and consequently toner smear tends to be caused. In addition, since the charging distribution of the toner in the developing device is unstable, unevenness of the image density, that is, an image defect, is generated.

It is to be noted that, in the technique disclosed in Japanese Patent Application Laid-Open No. 2011-154270, image data is analyzed and the characteristics of the printing object image are identified based on the positional relationship of colors, gradation distribution, resolution and the like, whereby it is possible to select a correction operation required for the image characteristics. However, the technique is not intended for suppressing generation of image defects due to a certain image formation condition, and therefore cannot solve the above-mentioned problems.

An object of the present invention is to provide an image forming apparatus and a page order changing program which can suppress generation of image defects under a certain image formation condition.

To achieve the abovementioned object, an image forming apparatus reflecting one aspect of the present invention includes: a determination section configured to determine whether there is a possibility of generation of an image defect during a printing job for image formation on a plurality of pages based on image data included in the printing job; and a changing section configured to change an order of the pages to be subjected to image formation such that an image defect is not generated when the determination section determines that there is a possibility of generation of the image defect.

Desirably, in the image forming apparatus, the determination section determines whether there is a possibility of generation of an image defect based on a coverage of a toner in pages, and the changing section changes the order of the pages in an order of lower coverage of the toner in the pages when the order of the pages is an order which possibly generates the image defect.

Desirably, in the image forming apparatus, the determination section determines whether there is a possibility of generation of an image defect based on a coverage of a toner in a sub-scanning direction at each position in a main scanning direction of pages, the sub-scanning direction being orthogonal to the main scanning direction, and the changing section changes the order of the pages such that pages whose coverage of a toner in the sub-scanning direction is equal to or greater than an allowable amount are not successively operated when the order of the pages is an order which possibly generates the image defect.

Desirably, in the image forming apparatus, the determination section compares a first portion and a second portion, the first portion being a portion in which a coverage of a toner in the sub-scanning direction is equal to or greater than the allowable amount in a given first page in the printing job, the second portion being a portion in which a coverage of a toner in the sub-scanning direction is equal to or greater than the allowable amount in a second page immediately preceding the first page in the printing job, and, when a position of the first portion and a position of the second portion in the main scanning direction overlap, the determination section determines that the order of the pages is an order which possibly generates an image defect.

Desirably, the image forming apparatus further includes a control section configured to perform an image formation process of the printing job based on an order of pages changed by the changing section, in which, when a page whose order possibly generates the image defect is included in the order of the pages changed by the changing section, the control section performs a process of preventing generation of the image defect in a course of the image formation process in accordance with a number of pages whose order possibly generates the image defect.

Desirably, in the image forming apparatus, the control section changes a condition for the operation of preventing generation of the image defect in accordance with a use history of an image forming member used for image formation.

Desirably, in the image forming apparatus, the control section changes a condition for the operation of preventing generation of the image defect in accordance with a use history of a developer used for image formation.

Desirably, in the image forming apparatus, when a first printing job and a second printing job are input to the image forming apparatus, and there is no page whose order does not easily generate the image defect when the order of the pages is changed in the first printing job, the changing section uses a page which is to be subjected to an image formation process in the second printing job as a page whose order is to be changed.

Desirably, in the image forming apparatus, the determination section determines whether there is a possibility of generation of an image defect based on a coverage of a toner in pages and a coverage of a toner in a sub-scanning direction orthogonal to a main scanning direction at each position of the pages in the main scanning direction, and, when the order of the pages is an order which possibly generates the image defect, the changing section changes the order of the pages in an order of lower coverage of the toner in the pages, and thereafter changes the order of the pages such that pages whose coverage of a toner in the sub-scanning direction is equal to or greater than an allowable amount are not successively operated.

Desirably, the image forming apparatus further includes a plurality of image forming sections corresponding to colors different from each other, in which the determination section calculates a coverage difference between a page having a largest coverage and a page having a smallest coverage for each color in the printing job, and calculates an average coverage for each color in the printing job to determine a reference color for determination whether there is a possibility of generation of an image defect in accordance with the coverage difference and the average coverage.

Desirably, in the image forming apparatus, the determination section determines whether there is a possibility of generation of an image defect based on a sheet width in a main scanning direction in the printing job, and, when the order of the pages is an order which possibly generates the image defect, the changing section changes the order of the pages in an order of greater width of the sheet in the main scanning direction.

Desirably, the image forming apparatus further includes: a control section configured to perform an image formation process of the printing job based on an order of pages changed by the changing section; and an image defect detection section configured to detect the image defect in a sheet on which an image is formed, in which the control section again performs an image formation process on a page on which the image defect is detected by the image defect detection section, and the changing section changes the order of the pages when again performing the image formation process.

Desirably, the image forming apparatus further includes: a control section configured to perform an image formation process of the printing job based on an order of pages changed by the changing section; and the control section performs an operation of notifying a user that the order of the pages is changed when the order of the pages is changed by the changing section.

Desirably, the image forming apparatus further includes: a control section configured to perform an image formation process of the printing job based on an order of pages changed by the changing section, in which after the order of the pages is changed by the changing section and an image formation process is performed in the order of the pages changed by the changing section, the control section resets the order of the pages to the order of the pages which is not changed by the changing section, and performs a sheet ejection operation.

To achieve the abovementioned object, a page order changing program of an image forming apparatus reflecting one aspect of the present invention is configured to cause a computer to execute processing comprising: determining whether there is a possibility of generation of an image defect during a printing job for image formation on a plurality of pages based on image data included in the printing job; and changing the order of the pages to be subjected to image formation such that the image defect is not generated when it is determined that there is a possibility of generation of the image defect.

Desirably, in the page order changing program, in the determining, whether there is a possibility of generation of an image defect is determined based on a coverage of a toner in pages; and in the changing, the order of the pages is changed in an order of lower coverage of the toner in the pages when the order of the pages is an order which possibly generates the image defect.

Desirably, in the page order changing program, in the determining, whether there is a possibility of generation of an image defect is determined based on a coverage of a toner in a sub-scanning direction at each position in a main scanning direction of pages, the sub-scanning direction being orthogonal to the main scanning direction, and in the changing, the order of the pages is changed such that pages whose coverage of a toner in the sub-scanning direction is equal to or greater than an allowable amount are not successively operated when the order of the pages is an order which possibly generates the image defect.

Desirably, in the page order changing program, in the determining, a first portion and a second portion are compared, the first portion being a portion in which a coverage of a toner in the sub-scanning direction is equal to or greater than the allowable amount in a given first page in the printing job, the second portion being a portion in which a coverage of a toner in the sub-scanning direction is equal to or greater than the allowable amount in a second page immediately preceding the first page in the printing job, and, when a position of the first portion and a position of the second portion in the main scanning direction overlap, it is determined that the order of the pages is an order which possibly generates an image defect.

Desirably, in the page order changing program, the page order changing program causes the computer to execute processing comprising controlling an image formation process of the printing job based on an order of pages changed in the changing, and, in the controlling, when a page whose order possibly generates the image defect is included in the order of the pages changed by the changing, a process of preventing generation of the image defect is performed in a course of the image formation process in accordance with a number of pages whose order possibly generates the image defect.

Desirably, in the page order changing program, in the determining, whether there is a possibility of generation of an image defect is determined based on a sheet width in a main scanning direction in the printing job, and, in the changing, when the order of the pages is an order which possibly generates the image defect, the order of the pages is changed in an order of greater width of the sheet in the main scanning direction.

DESCRIPTION OF THE PREFERRED EMBODIMENTS

Figure 1:
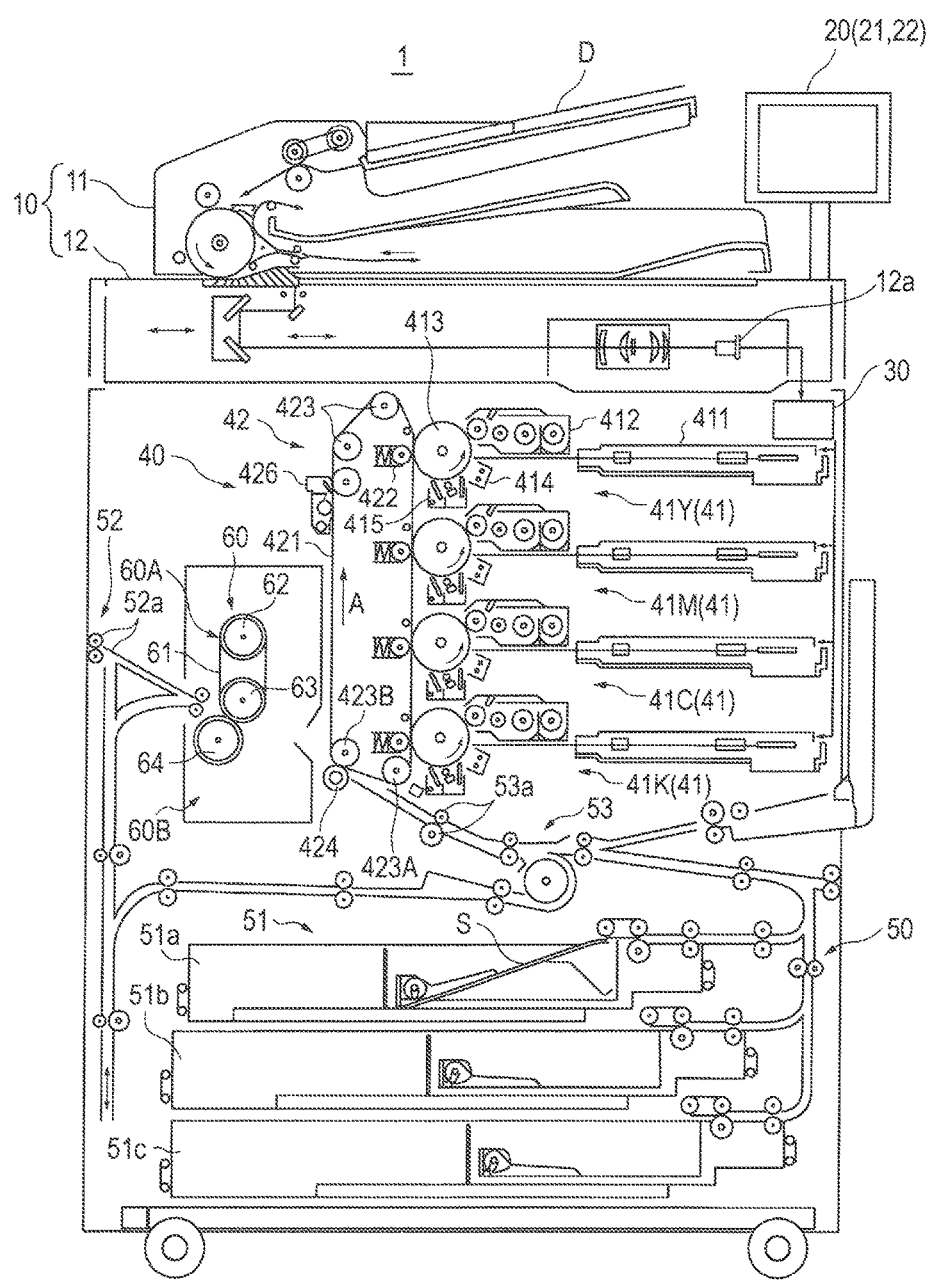
FIG. 1 schematically illustrates a general configuration of an image forming apparatus according to an embodiment.
Figure 2:
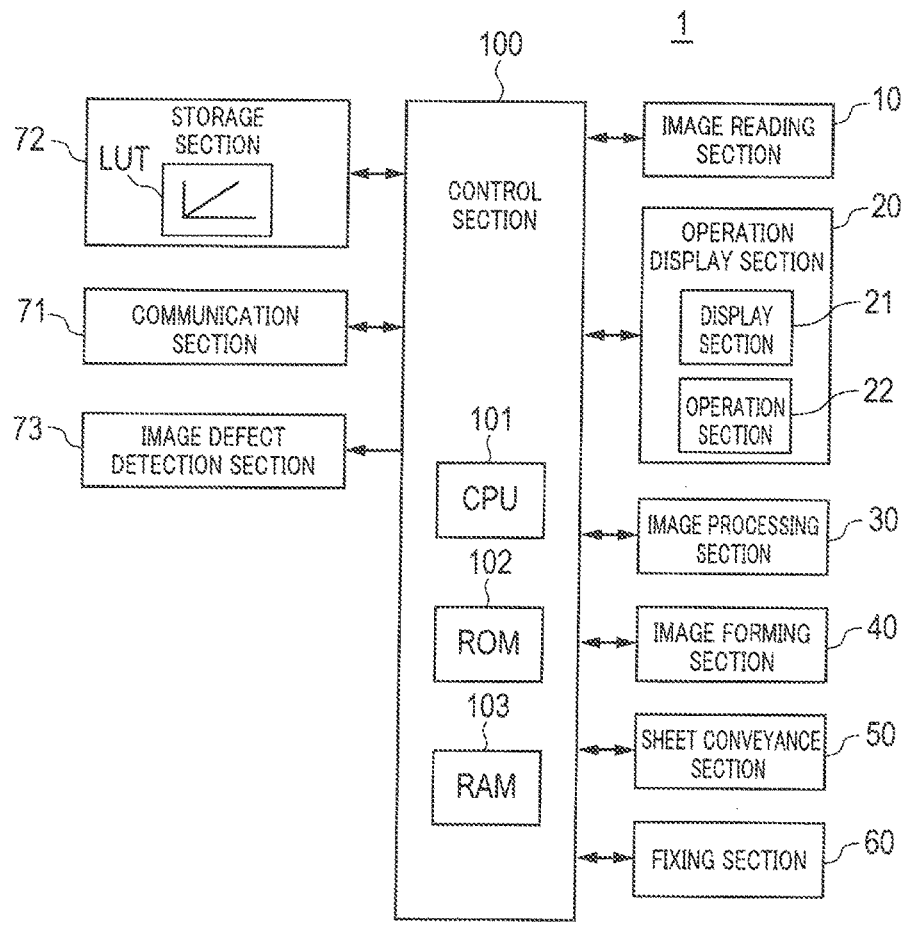
FIG. 2 illustrates a principal part of a control system of the image forming apparatus according to the embodiment.

In the following, the present embodiment is described in detail with reference to the drawings. FIG. 1 illustrates an overall configuration of image forming apparatus 1 according to the present embodiment. FIG. 2 illustrates a principal part of a control system of image forming apparatus 1 according to the embodiment.

Image forming apparatus 1 illustrated in FIGS. 1 and 2 is a color image forming apparatus of an intermediate transfer system using electrophotographic process technology. That is, image forming apparatus 1 transfers (primary-transfers) toner images of yellow (Y), magenta (M), cyan (C), and black (K) formed on photoconductor drums 413 to intermediate transfer belt 421, and superimposes the toner images of the four colors on one another on intermediate transfer belt 421. Then, image forming system 1 secondary-transfers the resultant image to sheet S, thereby forming an image.

A longitudinal tandem system is adopted for image forming apparatus 1. In the longitudinal tandem system, respective photoconductor drums 413 corresponding to the four colors of YMCK are placed in series in the travelling direction (vertical direction) of intermediate transfer belt 421, and the toner images of the four colors are sequentially transferred to intermediate transfer belt 421 in one cycle.

Image forming apparatus 1 includes image reading section 10, operation display section 20, image processing section 30, image forming section 40, sheet conveyance section 50, fixing section 60 and control section 100.

Control section 100 includes central processing unit (CPU) 101, read only memory (ROM) 102, random access memory (RAM) 103 and the like. CPU 101 reads a program suited to processing contents out of ROM 102, develops the program in RAM 103, and integrally controls an operation of each block of image forming apparatus 1 in cooperation with the developed program. At this time, CPU 101 refers to various kinds of data stored in storage section 72. Storage section 72 is composed of, for example, a non-volatile semiconductor memory (so-called flash memory) or a hard disk drive.

Control section 100 transmits and receives various data to and from an external apparatus (for example, a personal computer) connected to a communication network such as a local area network (LAN) or a wide area network (WAN), through communication section 71. Control section 100 receives, for example, image data (input image data) transmitted from the external apparatus, and performs control to form an image on sheet S on the basis of the image data. Communication section 71 is composed of, for example, a communication control card such as a LAN card.

Image reading section 10 includes auto document feeder (ADF) 11, document image scanning device 12 (scanner), and the like.

Auto document feeder 11 causes a conveyance mechanism to feed document D placed on a document tray, and sends out document D to document image scanner 12. Auto document feeder 11 enables images (even both sides thereof) of a large number of documents D placed on the document tray to be successively read at once.

Document image scanner 12 optically scans a document fed from auto document feeder 11 to its contact glass or a document placed on its contact glass, and brings light reflected from the document into an image on the light receiving surface of charge coupled device (CCD) sensor 12a, to thereby read the document image. Image reading section 10 generates input image data on the basis of a reading result provided by document image scanner 12. Image processing section 30 performs predetermined image processing on the input image data.

Operation display section 20 includes, for example, a liquid crystal display (LCD) provided with a touch panel, and functions as display section 21 and operation section 22. Display section 21 displays various operation screens, image conditions, operating statuses of functions, and the like in accordance with display control signals received from control section 100. Operation section 22 includes various operation keys such as numeric keys and a start key, receives various input operations performed by a user, and outputs operation signals to control section 100.

Image processing section 30 includes a circuit that performs a digital image process suited to initial settings or user settings on the input image data, and the like. For example, image processing section 30 performs tone correction on the basis of tone correction data (tone correction table), under the control of control section 100. In addition to the tone correction, image processing section 30 also performs various correction processes such as color correction and shading correction as well as a compression process, on the input image data. Image forming section 40 is controlled on the basis of the image data that has been subjected to these processes.

Image forming section 40 includes: image forming units 41Y, 41M, 41C, and 41K that form images of colored toners of a Y component, an M component, a C component, and a K component on the basis of the input image data; intermediate transfer unit 42; and the like.

Image forming units 41Y, 41M, 41C, and 41K for the Y component, the M component, the C component, and the K component have similar configurations. For ease of illustration and description, common elements are denoted by the same reference signs. Only when elements need to be discriminated from one another, Y, M, C, or K is added to their reference signs. In FIG. 1, reference signs are given to only the elements of image forming unit 41Y for the Y component, and reference signs are omitted for the elements of other image forming units 41M, 41C, and 41K.

Image forming unit 41 includes exposing device 411, developing device 412, photoconductor drum 413, charging device 414, drum cleaning device 415 and the like.

Photoconductor drum 413 is a negative-charging type organic photoconductor (OPC) having photoconductivity in which an undercoat layer (UCL), a charge generation layer (CGL), and charge transport layer (CTL) are sequentially stacked on a peripheral surface of a conductive cylindrical body made of aluminum (aluminum raw pipe), for example.

Charging device 414 causes corona discharge to evenly negatively charge the surface of photoconductor drum 413 having photoconductivity.

Exposure device 411 is composed of, for example, a semiconductor laser, and configured to irradiate photoconductor drum 413 with laser light corresponding to the image of each color component. The positive charge is generated in the charge generation layer of photoconductor drum 413 and is transported to the surface of the charge transport layer, whereby the surface charge (negative charge) of photoconductor drum 413 is neutralized. An electrostatic latent image of each color component is formed on the surface of photoconductor drum 413 by the potential difference from its surroundings.

Developing device 412 is a developing device of a two-component reverse type, and attaches toners of respective color components to the surface of photoconductor drums 413, and visualizes the electrostatic latent image to form a toner image. Developing device 412 forms a toner image on the surface of photoconductor drum 413 by supplying the toner included in the developer to photoconductor drum 413.

Drum cleaning device 415 includes a drum cleaning blade that is brought into sliding contact with the surface of photoconductor drum 413, and removes residual toner that remains on the surface of photoconductor drum 413 after the primary transfer.

Intermediate transfer unit 42 includes intermediate transfer belt 421, primary transfer roller 422, a plurality of support rollers 423, secondary transfer roller 424, belt cleaning device 426 and the like.

Intermediate transfer belt 421 is composed of an endless belt, and is stretched around the plurality of support rollers 423 in a loop form. At least one of the plurality of support rollers 423 is composed of a driving roller, and the others are each composed of a driven roller. When driving roller rotates, intermediate transfer belt 421 travels in direction A at a constant speed. Intermediate transfer belt 421 is a belt having conductivity and elasticity, and is driven into rotation with a control signal from control section 100.

Primary transfer rollers 422 are disposed on the inner periphery side of intermediate transfer belt 421 to face photoconductor drums 413 of respective color components. Primary transfer rollers 422 are brought into pressure contact with photoconductor drums 413 with intermediate transfer belt 421 therebetween, whereby a primary transfer nip for transferring a toner image from photoconductor drums 413 to intermediate transfer belt 421 is formed.

Secondary transfer roller 424 is disposed to face backup roller 423B disposed on the downstream side in the belt travelling direction relative to driving roller 423A, at a position on the outer peripheral surface side of intermediate transfer belt 421. Secondary transfer roller 424 is brought into pressure contact with backup roller 423B with intermediate transfer belt 421 therebetween, whereby a secondary transfer nip for transferring a toner image from intermediate transfer belt 421 to sheet S is formed.

Belt cleaning device 426 removes transfer residual toner which remains on the surface of intermediate transfer belt 421 after a secondary transfer.

When intermediate transfer belt 421 passes through the primary transfer nip, the toner images on photoconductor drums 413 are sequentially primary-transferred to intermediate transfer belt 421. To be more specific, a primary transfer bias is applied to primary transfer rollers 422, and an electric charge of the polarity opposite to the polarity of the toner is applied to the rear side, that is, a side of intermediate transfer belt 421 that makes contact with primary transfer rollers 422 whereby the toner image is electrostatically transferred to intermediate transfer belt 421.

Thereafter, when sheet S passes through the secondary transfer nip, the toner image on intermediate transfer belt 421 is secondary-transferred to sheet S. To be more specific, a secondary transfer bias is applied to backup roller 423B, and an electric charge of the polarity identical to the polarity of the toner is applied to the front side, that is, a side of sheet S that makes contact with intermediate transfer belt 421 whereby the toner image is electrostatically transferred to sheet S.

Fixing section 60 includes upper fixing section 60A having a fixing side member disposed on a fixing surface side, that is, a side of the surface on which a toner image is formed, of sheet S, lower fixing section 60B having a rear side supporting member disposed on the rear surface side, that is, a side of the surface opposite to the fixing surface, of sheet S, and the like. The back side supporting member is brought into pressure contact with the fixing side member, whereby a fixing nip for conveying sheet S in a tightly sandwiching manner is formed.

At the fixing nip, fixing section 60 applies heat and pressure to sheet S on which a toner image has been secondary-transferred to fix the toner image on sheet S.

Upper side fixing section 60A includes endless fixing belt 61, heating roller 62 and fixing roller 63, which serve as a fixing side member. Fixing belt 61 is installed in a stretched state between heating roller 62 and fixing roller 63.

Lower fixing section 60B includes pressure roller 64 that is the rear side supporting member. Together with fixing belt 61, pressure roller 64 forms a fixing nip for conveying sheet S in a sandwiching manner.

In addition, image defect detection section 73 is provided at a given position on the downstream side of fixing section 60. Image defect detection section 73 is a scanner, for example. Image defect detection section 73 reads an image formed on sheet S and compares the image with the image data of the image to detect an image defect.

Sheet conveyance section 50 includes sheet feeding section 51, sheet ejection section 52, conveyance path section 53 and the like. Three sheet feed tray units 51a to 51c included in sheet feeding section 51 store sheets S (standard sheets, special sheets) discriminated on the basis of the basis weight, the size, and the like, for each type set in advance.

Conveyance path section 53 includes a plurality of pairs of conveyance rollers such as a pair of registration rollers 53a, and the like. Sheets S stored in sheet tray units 51a to 51c are output one by one from the uppermost, and conveyed to image forming section 40 by conveyance path section 53. At this time, the registration roller section in which the pair of registration rollers 53a are arranged corrects skew of sheet S fed thereto, and the conveyance timing is adjusted. Then, in image forming section 40, the toner image on intermediate transfer belt 421 is secondary-transferred to one side of sheet S at one time, and a fixing process is performed in fixing section 60. Sheet S on which an image has been formed is ejected out of the image forming apparatus by sheet ejection section 52 including sheet ejection rollers 52*a*.

Incidentally, regarding various image defects which are generated during image formation, it has been confirmed that the frequency of generation of image defects is increased under a certain image formation condition among the conditions which generates the various image defects.

Examples of such an image formation condition include a first image formation condition in which pages having a high coverage are successively processed, and a second image formation condition in which the coverage extremely increases after pages having a low coverages are successively processed. In the case of the first image formation condition, the toner consumption amount per page is large, and the frequency of supply of toner into developing device 412 is high. The supplied toner is mixed with the charged toner without being sufficiently charged, and consequently the charging distribution of the toner in developing device 412 tends to be unstable. In addition, in the case of the second image formation condition, when pages having a low coverage are successively processed, toner stays in developing device 412 for a long periods of time, and the toner is degraded, and consequently, the fluidity of the toner in developing device 412 decreases. When a large amount of toner is supplied to developing device 412 in which the fluidity of the toner is reduced, charging of the supplied toner is inhibited. When the proportion of the toner whose charge amount is small increases in the developing device, toner scattering and the like easily occur. When the toner scattering amount increases, the toner accumulation amount in image forming apparatus 1 also increases, and toner smear is caused. In addition, since the charging distribution of the toner in developing device 412 is unstable, unevenness of the image density, that is, an image defect, is generated.

Another example of the above-mentioned image formation condition is a third image formation condition in which pages on which the toner of a high coverage is located at one position in the main scanning direction of the sheet are successively processed. In the case of the third image formation condition, for example, light exposure is continuously concentrated at the same position in the main scanning direction of photoconductor drum 413, and the electric charge is continuously generated. Consequently, the difference between the desired surface potential and the actual surface potential is easily caused, thus resulting in sensitivity unevenness. In addition, since the coverage of the toner is high, external additives, lubricants or the like adhering on the toner are separated from the toner, and the adhering amount to photoconductor drum 413 becomes excessive, and consequently, potential unevenness at photoconductor drum 413 is easily generated. In addition, in this case, when a portion where the toner concentrates at one position in the main scanning direction, and another portion where the toner is insufficient at a portion other than the one position in the main scanning direction exist, the adhering amount of the external additive on photoconductor drum 413 is large at the concentrating portion, and small at the insufficient portion. Therefore, the external additive of the concentrating portion slips through the drum cleaning blade portion of drum cleaning device 415 for removing the transfer residual toner on photoconductor drum 413. As a result, cleaning failure occurs, and memory and/or unevenness are caused at photoconductor drum 413. When sensitivity unevenness, potential unevenness or the like occurs at photoconductor drum 413, streak lines and/or belt-like lines in the sub-scanning direction of the sheet, that is, an image defect, are generated.

In addition, sill another example of the above-mentioned image formation condition is a fourth image formation condition in which, after sheets whose width in the main scanning direction is small are successively processed, a sheet whose width is large is processed. In the case of the fourth image formation condition, under the influence of marks left on fixing belt 61 and/or fixing roller 63 by edges of the sheets whose width is small, the images on a sheet whose width is large is distorted, and streak lines in the sub-scanning direction, that is, an image defect, are generated.

In view of this, in the present embodiment, control section 100 extracts a predetermined condition based on image data included in the printing job for image formation on a plurality of pages, that is, an image formation condition. Control section 100 determines whether the order of the pages (hereinafter referred to as "page order") set in the image formation condition can possibly generate image defects based on the extracted predetermined condition. When it is determined that the image defect can possibly be caused, control section 100 changes the page order of the image formation so as not to generate image defects and executes the image formation process of the printing job. Control section 100 corresponds to "determination section," "changing section," and "control section" of the embodiment of the present invention.

The predetermined condition extracted by control section 100 is a first condition which is the coverage of the toner in the page, a second condition which is the coverage of the toner in the sub-scanning direction at each position of the page in the main scanning direction, and a third condition which is a sheet width in the main scanning direction in the printing job.

When the predetermined condition is the first condition, the page order which can possibly generate image defects is an order in the first image formation condition in which pages with a high coverage (for example, 30% or greater) are successively processed, and an order in the second image formation condition in which, after pages with a low coverage (for example, 0.3%) are successively processed, a page whose coverage is extremely high is processed. In the case of such page orders, control section 100 changes the page order in the order of lower coverage. For example, a page order of a page having a coverage of 0.3%, a page having a coverage of 30%, and a page having a coverage of 5% is changed to the order of the page having a coverage of 0.3%, the page having a coverage of 5%, and the page having a coverage of 30%. With the original page order, when the page having a coverage of 30% is processed after the pages having a coverage of 0.3% are successively processed, the image defect is easily caused since the coverage is extremely increased. In the present embodiment, the page order is changed such that the page having a coverage of 5% is processed after the page having a coverage of 0.3%, thus suppressing a page order in which the coverage is extremely increased after pages having a low coverage are successively processed. Since this suppresses a situation where the toner supply amount in developing device 412 is extremely increased, the supplied toner is easily charged, and increase of the toner having a small charge amount is suppressed. In this manner, toner scattering can be suppressed, and generation of image defects can be suppressed.

When the predetermined condition is the second condition, the page order which can possibly generate image defects is a third image formation condition in which pages whose coverage of the toner in the sub-scanning direction at one position in the page in the main scanning direction is greater than an allowable amount (for example, 50%) are successively processed. In the case of such a page order, control section 100 changes the page order such that the pages whose coverage of the toner is equal to or greater than the allowable amount are not successively processed.

Figure 3:
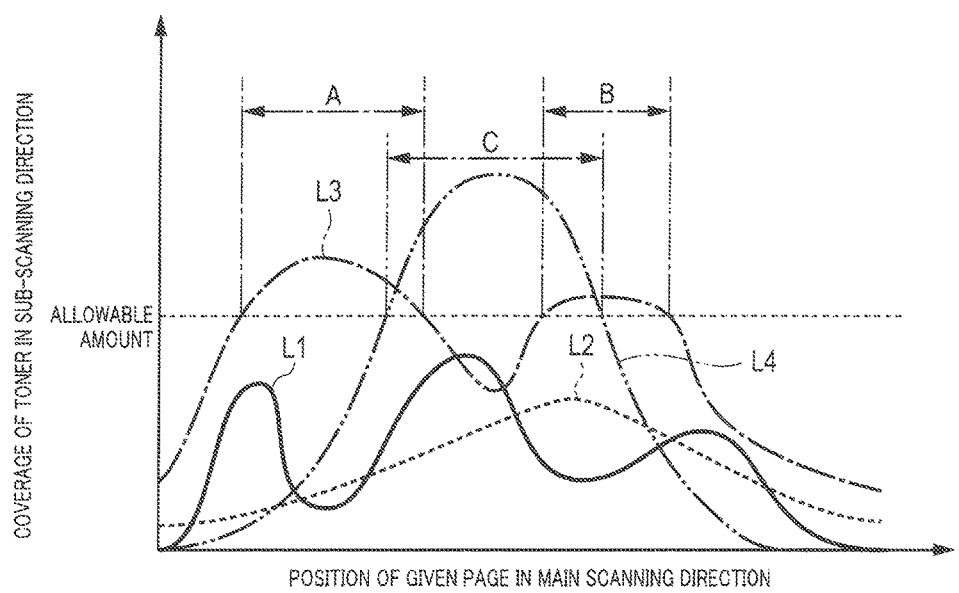
FIG. 3 illustrates a coverage of a toner in a sub-scanning direction with respect to a position in a main scanning direction in a given page.

FIG. 3 illustrates the coverage of the toner in the sub-scanning direction at each position of a given page in the main scanning direction. In FIG. 3, solid line L1 indicates a coverage of black toner, and broken line L2 indicates a coverage of yellow toner. In addition, dashed line L3 indicates a coverage of cyan toner, and chain double-dashed line L4 indicates a coverage of magenta toner.

For example, as illustrated in FIG. 3, control section 100 extracts the coverage of the toner in the sub-scanning direction at each main scanning direction position of a toner image to be printed on a given page, and determines whether the coverage of the extracted toner is not smaller than the allowable amount. In the example illustrated in FIG. 3, black (solid line L1) and yellow (broken line L2) do not exceed the allowable amount at all positions. In this case, regardless of the coverage of the black toner and yellow toner in the sub-scanning direction in the next page to be printed after the given page, the black toner or the yellow toner do not cause the image defect. However, cyan (dashed line L3) is equal to or greater than the allowable amount in range A and range B, and magenta (chain double-dashed line L4) is equal to or greater than the allowable amount in range C. In FIG. 3, a position in ranges A and B is the high coverage position of cyan, and a position in range C is the high coverage position of magenta.

Figure 4A:
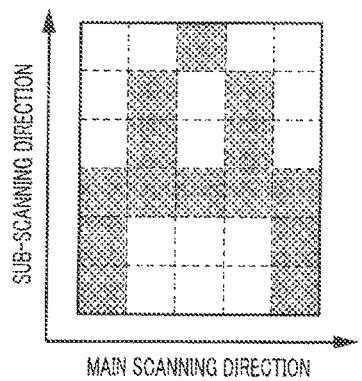
FIG. 4A illustrates a toner image of a given color in a given page.
Figure 4B:
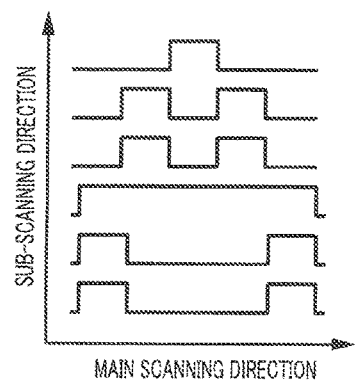
FIG. 4B illustrates a toner distribution at each sub-scanning direction position in the toner image of FIG. 4A.
Figure 4C:
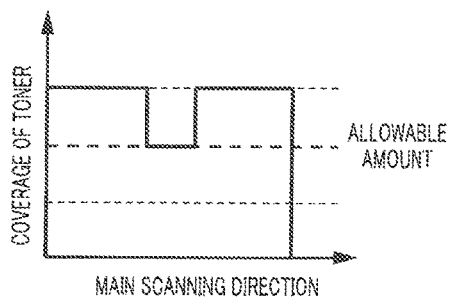
FIG. 4C illustrates a coverage of a toner at each main scanning direction position based on the toner distribution of FIG. 4B.
Figure 4D:
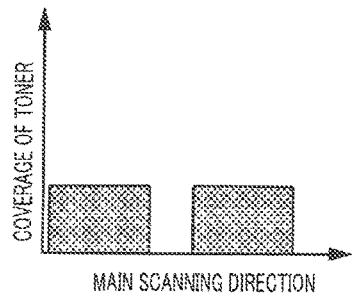
FIG. 4D illustrates portions exceeding the allowable amount which is extracted from the coverage of the toner based on FIG. 4C.

A method of extracting the coverage of the toner in the sub-scanning direction at each high coverage position is described. FIG. 4A illustrates a given color toner image in a given page. FIG. 4B illustrates a toner distribution at each sub-scanning direction position in the toner image of FIG. 4A. FIG. 4C illustrates a coverage of a toner at each main scanning direction position based on the toner distribution of FIG. 4B. FIG. 4D illustrates portions exceeding the allowable amount which is extracted from the coverage of the toner based on FIG. 4C.

First, as illustrated in FIG. 4A, control section 100 extracts a toner distribution at each position in the sub-scanning direction from image data of a given color in a given first page as illustrated in FIG. 4B. In each toner distribution of FIG. 4B, a portion protruding upward indicates that toner exists at the position in the main scanning direction, and a portion not protruding upward indicates that no toner exists at the position in the main scanning direction. From this toner distribution, control section 100 counts the portion protruding upward, and calculates the coverage of the toner in the sub-scanning direction as illustrated in FIG. 4C. After calculating the coverage of the toner in the sub-scanning direction, control section 100 extracts from the coverage of the toner a portion which is equal to or greater than the allowable amount as illustrated in FIG. 4D. Control section 100 compares portions having a value equal to or greater than the allowable amount between a given first page, and a second page preceding the first page, and determines whether portions having a value not smaller than the allowable amount exist at the same position in the main scanning direction. When portions having a value equal to or greater than the allowable amount exist at the same position in the main scanning direction, control section 100 determines that the order of the first page and the second page is an order which can possibly generate image defects. Control section 100 changes the page order such that the first page and the second page are not successively processed and that the portions having a value equal to or greater than the allowable amount are not located at the same position in the main scanning direction. When portions having a value equal to or greater than the allowable amount do not exist at the same position in the main scanning direction, control section 100 does not change the page order. Such a changing operation of the page order is repeatedly performed for each page. The changing operation may be completely performed prior to a start of a printing job, or may be appropriately performed during a printing job. In addition, in the changing operation, it is possible to divide the total pages of a printing job into several pages to perform the operation in a unit of the divided pages.

In addition, when the predetermined condition is the third condition, the page order which can possibly generate image defects is a fourth image formation condition in which, after sheets whose width in the main scanning direction is small are successively processed, a sheet whose width is large is printed. In the case of such a page order, control section 100 changes the page order in the order of greater width of the sheet in the main scanning direction. With such a page order, even when a sheet whose width is large has left marks of the edges of the sheet on fixing belt 61 and/or fixing roller 63, sheets whose width is small pass through portions inside the marks, and thus generation of streak lines in the sub-scanning direction due to the marks of the edges of the sheet is suppressed.

Control section 100 may separately perform the operations of the first condition, the second condition and the third condition, or may combine the operations of the first condition, the second condition and the third condition.

In addition, control section 100 may perform an operation of changing the page order when an image formation process is again performed on a page in which an image defect is detected by image defect detection section 73. In this manner, it is possible to suppress an image defect which is again generated when an image formation process is again performed. In addition, it is possible to select and execute one or more operations of the first condition, the second condition and the third condition in accordance with the image defect detected by image defect detection section 73.

In addition, in the case where the page order is changed, control section 100 may perform an operation of notifying the change of the page order to the user. In this manner, the user can readily recognize the change of the page order. The change of the page order may be notified by, for example, inserting a blank sheet at a changed part, by laterally shifting the ejection position on the ejection tray, by attaching a sticky note at the changed page, by separately printing out information of the changed page order, by displaying the information of the changed page order on the display section of the apparatus or the like. In addition, the notification of the change of the page order may also be performed by storing information of the changed page order in a storage section of the apparatus or the like, and notifying the change of the page order to the operator, for example.

In addition, in the case where the page order is changed and an image formation process is performed in the changed page order, control section 100 may perform an operation of resetting the page order to the page order of the unchanged state before ejecting the sheets. With this configuration, the operation of resetting the page order of the user is not required. A conceivable operation of resetting the page order to the page order of the unchanged state is changed and ejecting the sheets is an operation in which, with a plurality of reserving sections provided in image forming apparatus 1 which can temporarily reserve sheets, pages are input to respective reserving sections one by one in the changed page order, and, after all reserving sections are provided with respective pages, the sheets are again fed in the original page order from the reserving section, for example.

Incidentally, in the case where an image formation process with a plurality of colors is performed in image forming apparatus 1, two or more colors, of the plurality of colors, can possibly be colors for suppressing the image defect in the first condition which is the coverage of the toner in the page, and the second condition which is the coverage of the toner in the sub-scanning direction at each position of the page in the main scanning direction. In this case, control section 100 sets the color which most frequently causes image defects as the priority color. Control section 100 uses the priority color as a reference for determining whether the image defect can possibly be generated, and changes the page order based on the determination result obtained with the priority color as a reference.

In the case of the first condition, control section 100 detects the page of the maximum coverage and the page of the minimum coverage during the printing job for each color, and determines a first color having a largest coverage difference between the page of the maximum coverage and the page of the minimum coverage as the priority color. One reason for this is that, the toner supply amount of the color having the largest coverage difference in developing device 412 tends to be extremely large, and consequently the charging of the toner in developing device 412 tends to be most unstable.

In the case of the second condition, control section 100 detects the average coverage of each color during the printing job, and determines a second color having the largest average coverage as the priority color. The operation of the present embodiment can preferentially select the second color having the largest average coverage during the printing job, and therefore is useful for printing jobs including many images such as a photograph rather than printing jobs including many letters and the like.

In the case where the first color and the second color are identical to each other, control section 100 determines the first color as the priority color. In the case where the first color and the second color are different from each other, control section 100 determines the color which exceeds a prescribed threshold in each condition as the priority color. To be more specific, in the case of the first condition, control section 100 compares a predetermined difference (for example, 30%) at which defects can be highly possibly generated, with the coverage difference between the maximum coverage and the minimum coverage in the first color image. When the coverage difference is greater than the predetermined difference, control section 100 sets the first color to the priority color. In the case of the second condition, control section 100 compares a predetermined coverage (for example, 20%) at which image defects can be highly possibly generated, with the average coverage in the second color. When the average coverage is greater than the predetermined coverage, control section 100 sets the second color as the priority color. In addition, when the coverage difference in the first color is greater than the predetermined difference, and the average coverage in the second color is greater than the predetermined coverage, control section 100 may determine the second color as the priority color in consideration of the fact that the number of the operations required for the second condition is greater than that of the first condition in the protection operation described later. The operations required for the protection operation includes an operation of agitating the inside of developing device 412 without performing development, and an operation of forming a toner band on photoconductor drum 413 and the like over the whole region in the main scanning direction. It is to be noted that, in the case where the coverage difference in the first color is greater than the predetermined difference, and the average coverage in the second color is greater than the predetermined coverage, it is possible to set the color which requires an operation required for the protection operation and/or a highly accurate operation as the priority color in consideration of the high possibility of generation of image defects. The highly accurate operation is an operation for a case where the coverage change is required to be suppressed for a color which easily scatters, an operation for a case where the timing of the agitation operation of developing device 412 in the protection operation is required to be correctly performed, or an operation for a case where the timing of the protection operation for colors which easily cause cleaning failure is required to be correctly performed. In addition, it is also possible to set the color which highly possibly generates image defects in comparison with the other color as the priority color in accordance with the performance image forming apparatus 1 to which the present invention is applied.

In addition, in the case where control section 100 combines the first condition and the second condition, control section 100 may perform an operation of changing the page order by the second condition after the page order is changed by the first condition. In general, as the coverage of the page increases, the area of the toner image increases, and therefore, by changing the page order by the first condition, that is, by changing the page order in the order of smaller coverage, it is possible to set the page order close to the page order according to the second condition. Therefore, the number of pages whose page order is changed by the second condition can be reduced.

Incidentally, in the case of double-sided printing, the coverages can be different from each other between the front surface and the rear surface in one page, and therefore the reference surface for changing the page order unclear. For example, a case where the front surface is used as the reference for changing the page order is considered. In the case of a page whose front surface has a low coverage and rear surface has a high coverage, the image defect can be easily caused since the page order is set based on the low coverage surface and the coverage can be abruptly increased at the time when the rear surface having a high coverage is printed.

In view of this, in the present embodiment, in the case of the first condition, control section 100 changes the page order with the surface having a larger coverage as the reference. In this manner, it is possible to prevent a situation where a toner image whose coverage is extremely high is formed after formation of toner images of low coverage are successively processed, and in turn, it is possible to suppress generation of image defects.

In addition, in the case of the second condition, control section 100 compares the coverages of the front surface and the rear surface, and changes the page order so as to advance a page in which the position of the high coverage is different between the front surface and the rear surface.

In addition, in the case of the third condition, the page order is changed in the order of greater sheet width in the main scanning direction also in double-sided printing.

Incidentally, a page order which can possibly generate image defects can still exist even after the page order is changed by the first condition and the second condition. In such a case where the desired page order is not set, control section 100 performs a protection operation. The protection operation for each condition is described below.

First, the protection operation of the first condition is described. In the case of the first condition, the page order is changed using the priority color as a reference in an image formation process using a plurality of colors, for example; however, the changed page order can be a page order which generates image defects of a color other than the priority color. In this case, in the case where an image defect is generated due to the third color other than the priority color at a part of the changed page order, control section 100 changes the priority color to the third color at the part of the changed page order. In this manner, it is possible to suppress generation of image defects due to the third color.

In addition, in the case of the first condition, image defects are generated even after the page order is changed when the job includes only high coverage pages. In this case, control section 100 counts the number of the pages where the desired page order is not set, and performs an operation of preventing generation of image defects in the process of the image formation process in a unit of a predetermined number of sheets (for example, 100 sheets). An example of the operation of preventing generation of image defects is an operation of agitating the inside of developing device 412 without performing development until the charge amount of the toner in developing device 412 is stabilized.

Next, the protection operation of the second condition is described. In the case of the second condition, for example, the average coverage increases in the last pages in the changed page order and/or in the case where toner images are successively formed at the same position in the main scanning direction in an image formation process using a plurality of colors, and naturally, there is a possibility that toner images are successively formed at the same position in the main scanning direction. In this case, control section 100 counts the number of the pages where the desired page order is not set, and interrupts the image formation in a unit of a predetermined number of sheets, and, performs the operation of preventing generation of image defects. The operation of preventing generation of image defects includes, in addition to an operation of idly turning photoconductor drum 413 without performing development as in the first condition, an operation of forming a toner band over the whole region in the main scanning direction on photoconductor drum 413 and the like. In the case of the second condition, image defects are easily caused when light exposure is concentrated at the same position in the main scanning direction, and therefore the charging state on the surface of photoconductor drum 413 can be reset to a uniform state by forming a toner band over the whole region in the main scanning direction. In addition, since the external additive and the like which adheres the toner are supplied over the whole region in the main scanning direction, that is, the entirety of the cleaning region, the amount of the external additive and the like can be uniformized in the entirety of the cleaning region.

In addition, control section 100 changes the condition for performing the operation of preventing generation of image defects in accordance with an image forming member used for image formation such as photoconductor drum 413, or the use history of the developer. Specifically, control section 100 reduces the predetermined number of sheets which serves as the timing for the operation of preventing generation of image defects. As the use history of photoconductor drum 413 increases, the surface potential and/or the durability of the cleaning section are reduced, and accordingly, memory and/or unevenness are easily generated. Further, in general, the tolerance against the coverage change is reduced by the use history of the developer, and disadvantageously the toner scattering amount increases and unevenness is easily generated. Such problems occur when the toner included in the developer is degraded without being consumed, and/or when the carrier included in the developer is worn with time. In the present embodiment, the operation of preventing generation of image defects is performed in accordance with the use history of photoconductor drum 413 and/or the developer, and thus generation of image defects can be suppressed. In addition, control section 100 may compare allowable sheet number D1 based on the use history of photoconductor drum 413, with allowable sheet number D2 based on the use history of the developer so as to set the smaller one to the number of predetermined number of sheets. It is to be noted that, in the case of the second condition, the allowable amount may be reduced.

In addition, in the case where a plurality of printing jobs such as the first printing job and the second printing job are input to image forming apparatus 1 and the page in which image defect is not easily caused does not exist in the change of the page order in the first printing job, control section 100 may perform an operation of using the page on which an image is formed in the second printing job as the page for order change. In this case, it suffices that control section 100 outputs the page to another ejection tray or marks the page such that the used page can be discriminated from another printing job.

Figure 5:
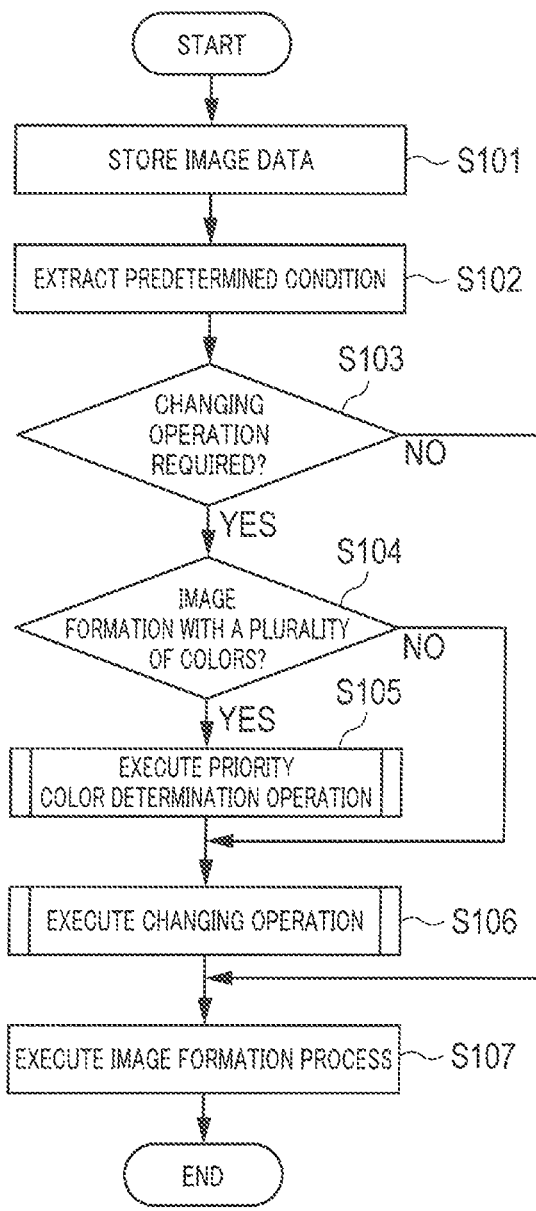
FIG. 5 is a flowchart of an exemplary operation of performing a printing job in the image forming apparatus.

Next, an example operation at the time of executing the printing job in image forming apparatus 1 having the above-mentioned control section 100 is described. FIG. 5 is a flowchart of an example operation at the time of executing the printing job in image forming apparatus 1. The process in FIG. 5 is executed when control section 101 receives a request for execution of a printing job, for example.

As illustrated in FIG. 5, control section 100 acquires the image data input by the printing job and stores the data in storage section 72 (step S101). Next, control section 100 extracts a predetermined condition from the acquired image data (step S102). In FIG. 5 to FIG. 8, the predetermined condition is exemplified as the first condition and the second condition.

Next, control section 100 determines whether a changing operation of changing the page order is required based on the extracted predetermined condition (step S103). When it is determined that the changing operation is not required (step S103, NO), the process is advanced to step S107. On the other hand, when it is determined that the changing operation is required (step S103, YES), control section 100 determines whether a plurality of colors are used in the image formation (step S104).

When it is determined that a plurality of colors are not used in the image formation (step S104, NO), the process is advanced to step S106. On the other hand, when it is determined that a plurality of colors are used in the image formation (step S104, YES), control section 100 performs an operation of determining the priority color (step S105).

Next, control section 100 executes the changing operation (step S106). Next, control section 100 executes the image formation process (step S107). After the image formation process, control section 100 terminates the process.

Figure 6:
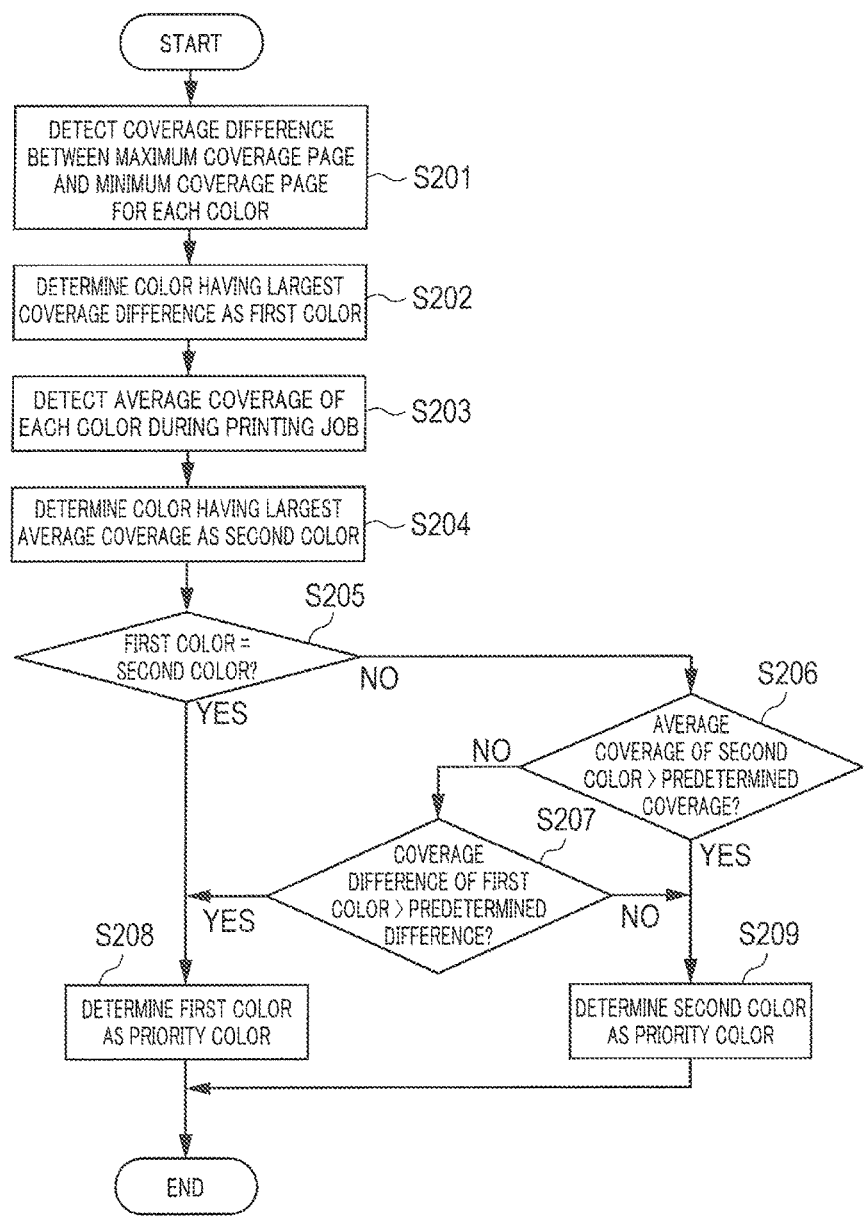
FIG. 6 is a flowchart of an exemplary operation of determining a priority color in the image forming apparatus.

Next, an exemplary operation of determining the priority color is described. FIG. 6 is a flowchart of an exemplary operation of determining the priority color in image forming apparatus 1.

As illustrated in FIG. 6, control section 100 detects the coverage difference between the page of the maximum coverage and the page of the minimum coverage for each color in the printing job (step S201). Next, control section 100 determines the color having the largest coverage difference as the first color (step S202).

Next, control section 100 detects the average coverage of each color during the printing job (step S203). Next, control section 100 determines the color having the largest average coverage as the second color (step S204).

Next, control section 100 determines whether the first color and the second color are identical to each other (step S205). When it is determined that the first color and the second color are different from each other (step S205, NO), control section 100 determines whether the average coverage of the second color is greater than the predetermined coverage (step S206).

When it is determined that the average coverage of the second color is equal to or smaller than the predetermined coverage (step S206, NO), control section 100 determines whether the coverage difference of the first color is greater than the predetermined difference (step S207). When it is determined that the coverage difference of the first color is greater than the predetermined difference (step S207, YES), the process is advanced to step S208. On the other hand, when it is determined that the coverage difference of the first color is equal to or smaller than the predetermined difference (step S207, NO), the process is advanced to step S209.

Returning to the determination process of step S205, when the first color and the second color are identical to each other (step S205, YES), control section 100 sets the priority color to the first color (step S208).

Returning to the determination process of step S206, when the average coverage of the second color is greater than the predetermined coverage (step S206, YES), control section 100 sets the priority color to the second color (step S209). After step S208 and S209, control section 100 terminates the process.

Figure 7:
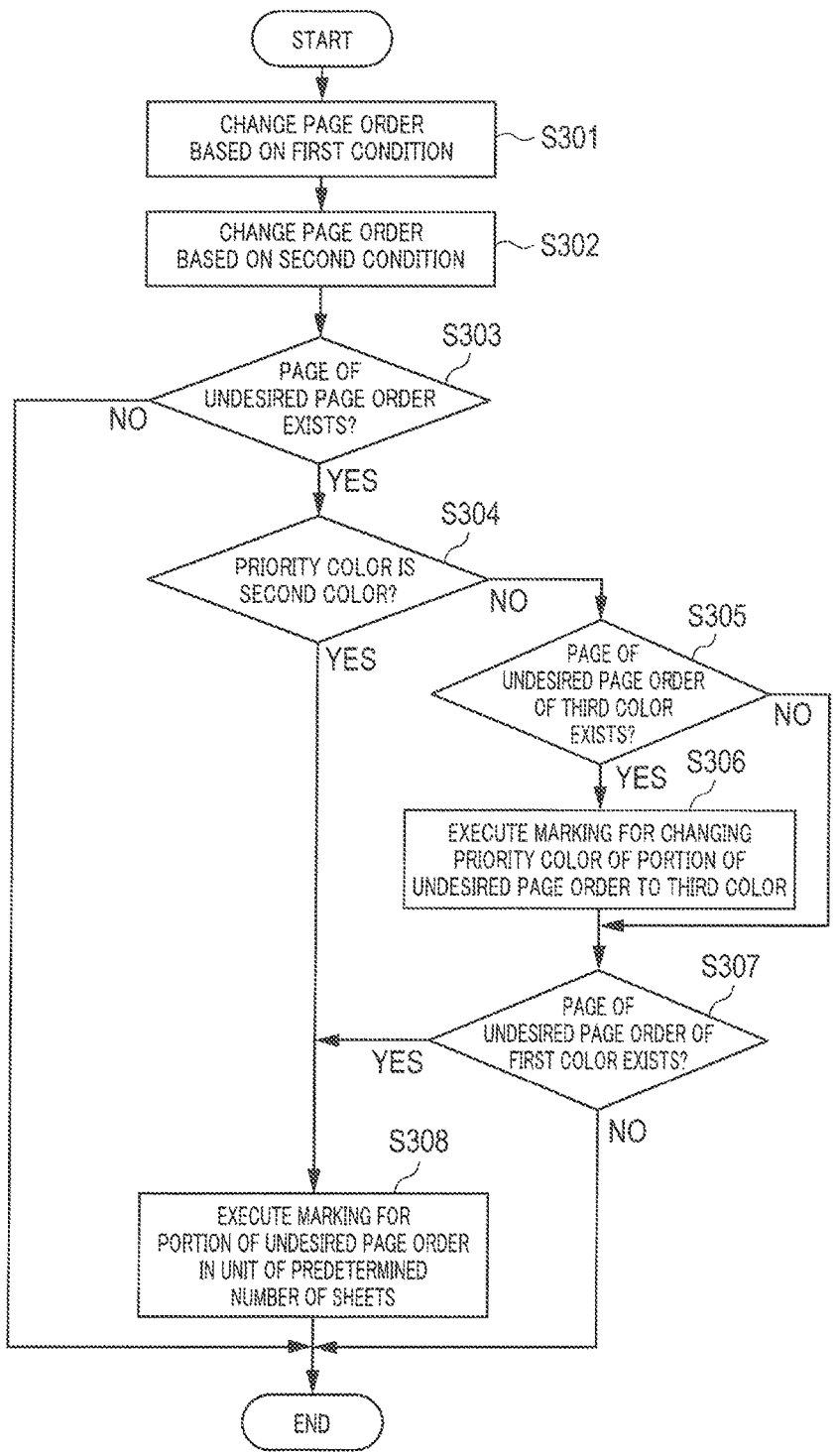
FIG. 7 is a flowchart of an exemplary operation of performing a changing operation in the image forming apparatus.

Next, an exemplary changing operation is described. FIG. 7 is a flowchart of an exemplary changing operation in image forming apparatus 1.

As illustrated in FIG. 7, control section 100 changes the page order to a page order based on the first condition (step S301). Next, control section 100 changes the page order to a page order based on the second condition (step S302).

Next, control section 100 determines whether there is a page where the desired page order is not set (step S303). When it is determined that a page where the desired page order is not set does not exist (step S303, NO), control section 100 terminates the process. On the other hand, when it is determined that a page where the desired page order is not set exists (step S303, YES), control section 100 determines whether the priority color is the second color (step S304). When an image formation process uses single color, the process is advanced to step S308 in the case of YES at step S303.

When it is determined that the priority color is the second color (step S304, YES), the process is advanced to step S308. On the other hand, when the priority color is not the second color (step S304, NO), control section 100 determines whether a portion of the third color where the desired page order is not set exists (step S305).

When it is determined that a portion of the third color where the desired page order is not set does not exist (step S305, NO), the process is advanced to step S307. On the other hand, when a portion of the third color where the desired page order is not set exists (step S305, YES), marking for changing the priority color of the portion of the third color where the desired page order is not set from the first color to the third color is performed (step S306). The marking is, for example, an operation of electronically marking a given page in the page order stored in storage section 72. In step S306, the given page is a page whose priority color is changed to the third color. That is, at step S306, when there are consecutive portions where the desired page order of the third color is not set, each page of the portions are marked.

Next, control section 100 determines whether there is a page where the desired page order of the first color is not set (step S307). When it is determined that a page where the desired page order of the first color is not set does not exist (step S307, NO), control section 100 terminates the process. On the other hand, when it is determined that there is a page where the desired page order of the first color is not set exists (step S307, YES), control section 100 marks the portion where the desired page order is not set in a unit of a predetermined number of sheets (step S308). After step S308, control section 100 terminates the process.

Figure 8:
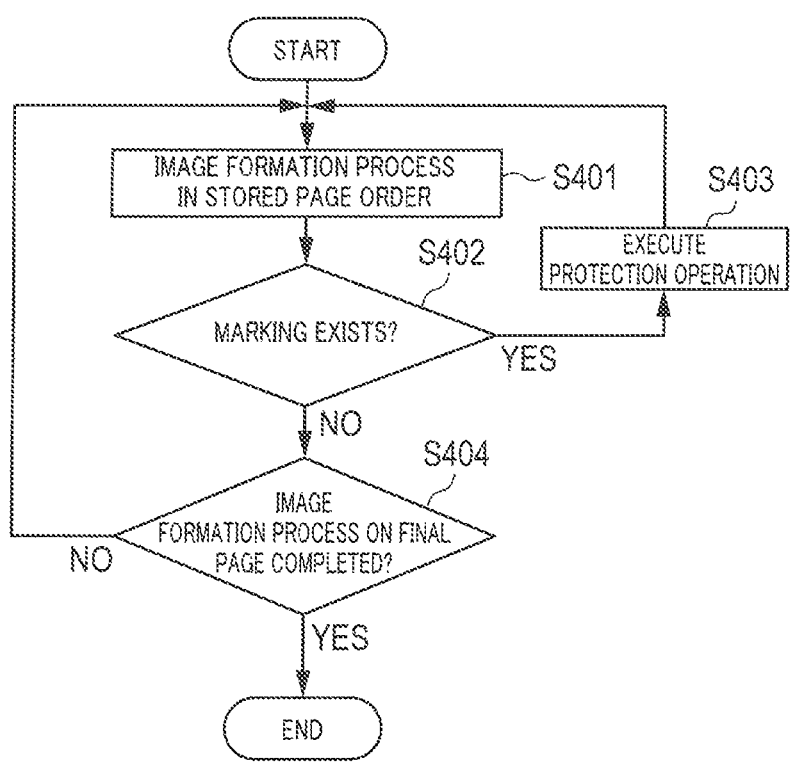
FIG. 8 is a flowchart of an exemplary operation of executing an image formation process in the image forming apparatus.
Figure 9A:
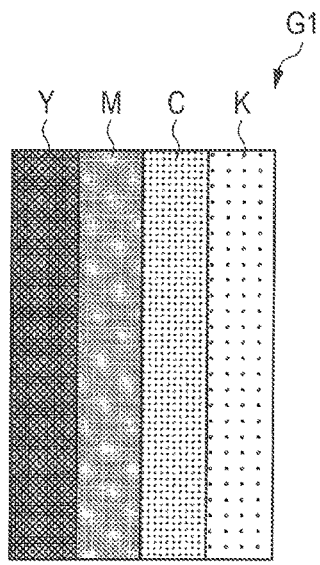
FIG. 9A to FIG. 9D illustrate a toner image used in Experiment 2.
Figure 9B:
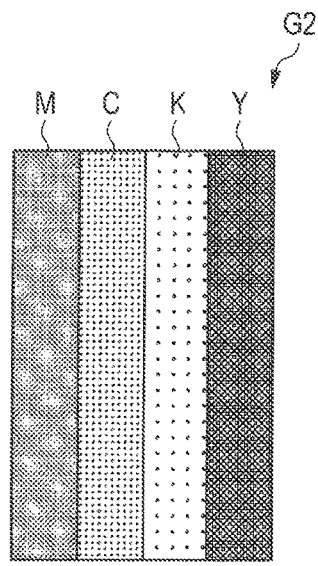
Figure 9C:
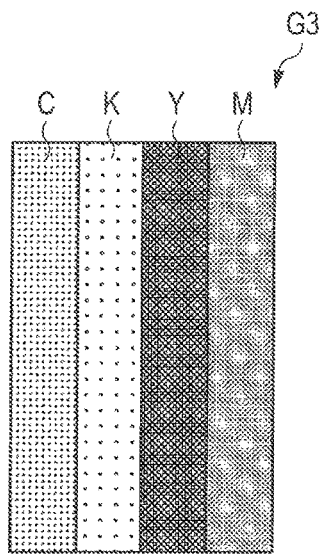
Figure 9D:
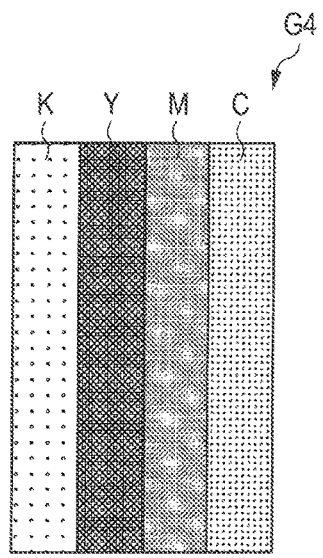

Next, an exemplary operation of executing the image formation process is described. FIG. 8 is a flowchart of an exemplary operation of executing the image formation process in image forming apparatus 1.

As illustrated in FIG. 8, control section 100 performs the image formation process in the page order stored in storage section 72 (step S401). Next, control section 100 determines whether the page to be subjected to the image formation process is marked (step S402).

When it is determined that the page is not marked (step S402, NO), the process is advanced to step S404. On the other hand, when it is determined that the page is marked (step S402, YES), control section 100 performs the protection operation (step S403). After step S403, the process is returned to step S401.

Next, control section 100 determines whether the image formation process of the final page is completed (step S404). When it is determined that the image formation process of the final page is not completed (step S404, NO), the process is returned to step S401. On the other hand, when it is determined that the image formation process of the final page is completed (step S404, YES), control section 100 terminates the process.

Image forming apparatus 1 having the above-mentioned configuration changes the page order in accordance with the first condition, the second condition and the third condition so as not to generate image defects, and thus can suppress generation of image defects under a certain image formation condition.

In addition, even when there is a page which can possibly generate image defects even after the page order is changed, generation of image defects can be suppressed by performing the protection operation.

It is to be noted that the page order changing program executed by control section 100 (computer) of image forming apparatus 1 in each process in the present embodiment is also applicable to a printer driver or the like suitable for a computer such as a personal computer and/or an image forming apparatus, for example.

The embodiments disclosed herein are merely exemplifications and should not be considered as limitative. While the invention made by the present inventor has been specifically described based on the preferred embodiments, it is not intended to limit the present invention to the above-mentioned preferred embodiments but the present invention may be further modified within the scope and spirit of the invention defined by the appended claims.

The present invention is applicable to an image forming system composed of a plurality of units including an image forming apparatus. The units include, for example, a post-processing apparatus, an external apparatus such as a control apparatus connected with a network, and the like.

Finally, the evaluation experiment conducted on image forming apparatus 1 according to the present embodiment is described. Image forming apparatus 1 illustrated in FIG. 1 was used to confirm the effectiveness of each operation in Experiments 1 to 10.

(Experiment 1)

In Experiment 1, the effectiveness of the operation according to the present embodiment was confirmed in the case where the page order of an image formation process of toner images having coverages largely different from each other is changed in the order of lower coverage.

To be more specific, in the operation according to the present embodiment, image formation processes of toner images having coverages of 0.3%, 5%, 30%, and 50% were performed in this order on an A3 sheet in a unit of 5,000 sheets. The image formation processes of the toner image having a coverage of 30% or 50% were performed for the case where the protection operation is performed and the case where the protection operation is not performed. As the protection operation, an operation of agitating the inside of developing device 412 without performing the development was performed for one minutes in a unit of 500 sheets. In addition, as a comparative example, image formation processes of toner images having coverages of 0.3%, 30%, 5%, and 50% were performed in this order in a unit of 5,000 sheets. Table 1 shows the toner smear rate and the presence/absence of unevenness of the image density of each coverage in the comparative example. Table 2 shows the toner smear rate and the presence/absence of unevenness of the image density of each coverage of in the present embodiment in the case where the protection operation was not performed. Table 3 shows the toner smear rate and the presence/absence of unevenness of the image density of each coverage in the case where the protection operation was performed in the present embodiment. It is to be noted that the evaluation result was confirmed by performing a solid image formation process of each color on the entire surface every time when the image formation process was performed 1,000 times.

TABLE 1

| Coverage | The toner smear rate | Image density unevenness |
| --- | --- | --- |
| 0.3% | 0.2% | Good |
| 30% | 3.2% | Poor |
| 5% | 0.7% | Good |
| 50% | 7.6% | Poor |

TABLE 2

| Coverage | The toner smear rate | Image density unevenness |
| --- | --- | --- |
| 0.3% | 0.2% | Good |
| 5% | 0.3% | Fair |
| 30% | 1.9% | Good |
| 50% | 3.4% | Fair |

TABLE 3

| Coverage | The toner smear rate | Image density unevenness |
| --- | --- | --- |
| 0.3% | 0.2% | Good |
| 5% | 0.3% | Good |
| 30% | 0.8% | Good |
| 50% | 1.1% | Good |

The toner smear rate in each table is a rate of the number of sheets on which toner smear is generated with respect to the total number of prints. In the "unevenness of the image density" of each table, "Good" indicates that unevenness of the image density was not generated, "Poor" indicates that unevenness of the image density was significantly generated, and "Fair" indicates that there is no practical problem although unevenness of the image density was slightly generated.

As shown in Table 1, in the comparative example, it was confirmed that the toner smear rate increased to 3.2% and 7.6% in the case of the coverages of 30% and 50% at which the coverage of the toner image extremely increases. In contrast, as shown in Table 2, it was confirmed that, in the operation according to the present embodiment in which protection operation is not performed, the toner smear rate was 1.9% when the coverage of the toner image was 30%, and the toner smear rate was 3.4% when the coverage of the toner image was 50%. That is, it was confirmed that the toner smear rate was improved in each coverage in comparison with the comparative example. In addition, in the operation according to the present embodiment in which the protection operation was performed, as shown in Table 3, it was confirmed that the toner smear rate was 0.8% when the coverage of the toner image was 30%, and the toner smear rate was 1.1% when the coverage of the toner image was 50%. That is, it was confirmed that the toner smear rate was further improved by performing the protection operation.

In addition, as shown in Table 1, in the comparative example, it was confirmed that unevenness of the image density was significantly generated when the coverage was 30% or 50%. In contrast, in the operation according to the present embodiment, as shown in Table 2, it was confirmed that the unevenness of the image density was slightly generated when the protection operation was not performed and the coverage was 30% or 50%. In addition, as shown in Table 3, it was confirmed that the unevenness of the image density was not generated when the protection operation was performed and the coverage was 30% or 50%. That is, it was confirmed that generation of the unevenness of the image density is suppressed by performing the operation according to the present embodiment.

(Experiment 2)

In Experiment 2, the effectiveness of the operation according to the present embodiment was confirmed in the case where the page order of the case where the toner images having a large coverage are continuously formed at the same position in the main scanning direction is changed such that the toner images having a large coverage are not successively processed at the same position in the main scanning direction.

To be more specific, the effectiveness was confirmed by forming toner images G1 to G4 illustrated in FIG. 9A to FIG. 9D on an A3 sheet as the operation according to the present embodiment. Toner images G1 to G4 illustrated in FIG. 9A to FIG. 9D are toner images in which colors are arranged from left, and the coverage of only one of the colors is set to 100% at the same position in the main scanning direction. In toner image G1 illustrated in FIG. 9A, colors are arranged in the order of Y, M, C and K from left at the same position in the main scanning direction. In toner image G2 illustrated in FIG. 9B, colors are arranged in the order of M, C, K and Y from left at the same position in the main scanning direction. In toner image G3 illustrated in FIG. 9C, colors are arranged in the order of C, K, Y and M from left at the same position in the main scanning direction. In toner image G4 illustrated in FIG. 9D, colors are arranged in the order of K, Y, M and C from left at the same position in the main scanning direction.

In the method for the experiment, images G1 to G4 respectively formed on four sheets are handled as one copy, and the image formation process is performed for 1,000 copies, that is, 4,000 sheets in total. In addition, as the protection operation, two operations are performed. In one of the two operations, when toner image G1 is continuously formed on 1,000 sheets, a toner band is formed on photoconductor drum 413 over the whole region in the main scanning direction for ten sheets in a unit of 500 sheets. In the other of the two operations, by conveying ten sheets on which no image is formed, development photoconductor drum 413 is idle-turned without performing the development photoconductor drum 413. In addition, as a comparative example, each of toner images G1 to G4 is formed on 1,000 sheets, that is, the toner images are formed 4,000 sheets in total. It is to be noted that, to confirm the evaluation result, a halftone image of each color was formed over the entire surface every time when 1,000 sheets are formed.

In the comparative example, it was confirmed that a thin streak line is formed at the position of the color of immediately preceding toner image G1, G2, G3, or G4 in the halftone image of each color on the entire surface obtained in a unit of 1,000 sheets. In contrast, it was confirmed that the streak lines are not formed in all halftone images on the entire surface in the case where the operation according to the present embodiment was performed. That is, the effectiveness of the operation according to the present embodiment was confirmed. In addition, it was confirmed that, by performing the protection operation, no streak line is formed on the halftone image on the entire surface even after the toner images are formed on 1,000 sheets as in the comparative example in which streak lines are formed. That is, it was confirmed that image defects can be suppressed even when toner images having a high coverage are successively formed at the same position in the main scanning direction. In addition, it was confirmed that no streak line is formed on the whole halftone image even when an operation of idle turning photoconductor drum 413 for ten sheets is performed without performing the development after forming a whole solid toner image corresponding to ten sheets on photoconductor drum 413 without conveying the sheet as another protection operation.

(Experiment 3)

In Experiment 3, the effectiveness of the operation according to the present embodiment was confirmed in the case where the page order of the case where images are successively formed on sheets having different widths is changed so as not to generate image defects.

To be more specific, as the operation according to the present embodiment, 5,000 A4-sheets are transversely conveyed after 5,000 SRA3-sheets are conveyed. Thereafter, one A4-sheet is longitudinally conveyed. In addition, as a comparative example, after 5,000 A4-sheets are longitudinally conveyed, 5,000 A4-sheets are transversely conveyed. Thereafter, one SRA3-sheet is conveyed. In addition, as the toner image, an image of each color having a coverage of 5% is formed in the entirety of the sheet in the main scanning direction.

In the comparative example, it was confirmed that gloss unevenness and/or streak lines are generated at positions corresponding to the width of the longitudinally conveyed A4 sheet in the transversely conveyed A4 sheet. In addition, it was confirmed that gloss unevenness and/or streak lines are generated at the positions corresponding to the width in the transversely conveyed A4 in the SRA3-sheet. In contrast, in the case where the operation according to the present embodiment is performed, it was confirmed that image defects such as streak lines are not caused in any of the above-mentioned sheets. That is, the effectiveness of the operation according to the present embodiment was confirmed.

(Experiment 4)

In Experiment 4, a case where the operation according to the present embodiment is applied to the case where an image formation process is again performed on a page on which an image defect is detected was confirmed. To be more specific, image defect detection section 73 was provided in image forming apparatus 1 which requires maintenance of toner and/or photoconductor drum 413, and whether an image defect is again generated when an image formation process is again performed after an image defect is caused was confirmed.

In the operation according to the present embodiment, the page order for again performing the image formation process is changed in accordance with detected image defects. To be more specific, in the case where toner spilling due to toner scattering is generated, the page order was changed in the order of lower coverage, and in the case where streak lines in the sub-scanning direction is generated, the page order was changed such that toner images having a high coverage are not successively processed at the same position in the main scanning direction. In addition, in the comparative example, the page order was not changed when the image formation process was again performed.

In the comparative example, when the image formation process was again performed, image defects were again generated at a rate of 3%. In contrast, in the operation according to the present embodiment, when the image formation process was again performed, image defects were again generated at a rate of 0.9%. That is, it was confirmed that the image defect generation rate of the case where the printing is again performed is improved by the operation according to the present embodiment.

(Experiment 5)

In Experiment 5, the effectiveness of the operation of notifying the change of the page order to the user when the page order is changed was confirmed. To be more specific, in the case where the page order of 150 pages in 1,000 sheets subjected to the image formation operation was changed, a blank sheet was inserted after the changed page was ejected. As a result, it was confirmed that the time for resetting the page order to the original state can be reduced to one tenths of the case where no blank sheet is inserted. In addition, it was confirmed that an effect similar to that of the operation of inserting a blank sheet can be obtained also by an operation of shifting the sheet ejection position on the sheet tray of the page whose page order is changed, an operation of attaching a sticky note on the page whose page order is changed, an operation of printing information of the page order stored in storage section 72 on another sheet, and an operation of displaying information of the page order stored in storage section 72 on display section 21.

(Experiment 6)

In Experiment 6, the effectiveness of the operation of resetting the page order to the original state in the case where the page order is changed was confirmed. The operation of resetting the page order to the original state is performed by providing 20 reserving sections which can again feeding a sheet on which an image is formed in image forming apparatus 1. To be more specific, in the case where images are formed on 1,000 sheets, five sheets for the case where the page order is changed, and 15 sheets for the case where the page order is not changed are stored in the reserving sections. Then, when sheets are stored in all reserving section, sheets are again fed such that the original page order stored in image forming apparatus 1 is set. It was confirmed that the page order can be reset to the original state by performing the above-mentioned operation in a unit of 20 pages.

(Experiment 7)

In Experiment 7, the effectiveness of the operation of preventing generation of image defects in accordance with the use history of photoconductor drum 413 and the use history of the toner was confirmed. To be more specific, the operation of reducing the number of sheets in accordance with the use history of photoconductor drum 413 and the use history of the toner by a predetermined number of sheets is performed. The predetermined number of sheets is set to smaller one of allowable sheet number D1 based on the use history of photoconductor drum 413 and allowable sheet number D2 based on the use history of the toner. The relationship of the allowable sheet number in accordance with the use history is shown in Table 4.

TABLE 4

| Use history | Number of sheet for printing in experiment 7 | Allowable number of sheets | |
| --- | --- | --- | --- |
| | | D1 | D2 |
| 0-25 | 0-50 thousand | 500 | 500 |
| 25-75 | 50 thousand-100 thousand | 350 | 400 |
| 50-75 | 100 thousand-150 thousand | 200 | 300 |
| 75-100 | 150 thousand-200 thousand | 50 | 200 |

The "use history" in Table 4 is the use history of photoconductor drum 413 or the toner in the case where the lifetime of photoconductor drum 413 or the toner is 200,000 prints.

In addition, as a comparative example, the protection operation in Experiment 1 or Experiment 2 was performed without changing the predetermined number of sheets. In this case, in each of the protection operations, image defects and the like were not generated in the unused condition, but the degree of image defects were gradually increased as the use history increased. Then, when the number of prints reaches a value around 200,000, the toner smear rate approximately increased by five times that of the unused condition in Experiment 1, and generation of significant unevenness of the image density increased. In Experiment 2, at a value around 200,000, significant streak lines were generated in all of the formed toner images. In contrast, in Experiment 7, favorable toner images were formed on sheets in a protection operation similar to that of Experiment 1, without changing the toner smear rate from the unused condition and without generating unevenness of the image density. In addition, favorable toner images were formed on sheets in a protection operation similar to that of Experiment 2 without generating streak lines in all sheets even when the number of prints reached 200,000 sheets.

(Experiment 8)

In Experiment 8, the effectiveness of the operation of using a page to which an image is formed in another printing job as the page for order change when there is no page whose page order is the desired page order in the printing job in the case where a plurality of printing jobs are stored was confirmed. To be more specific, the toner images G1 to G4 illustrated in FIG. 9A to FIG. 9D used in Experiment 2 were formed in this order in a unit of 1,000 sheets. In addition, as a comparative example, the image formation process was performed with four printing jobs stored in storage section 72 for forming each of toner image G1, toner image G2, toner image G3, and toner image G4 on 1,000 sheets. As a result, it was confirmed that, while streak lines were formed in the resulting toner image in the comparative example, no streak line was formed in the resulting toner image in Experiment 8.

(Experiment 9)

In Experiment 9, the effectiveness of the operation of changing the page order by the second condition after the page order is changed by the first condition in the case where the operation for the first condition and the operation for the second condition are combined was confirmed. As a comparative example, an operation of changing the page order by the first condition after the page order is changed by the second condition was performed. As the condition of the experiment, the coverage difference between the maximum coverage and the minimum coverage of a given color was set to 30%, and the average coverage thereof was set to 20% in a printing job for 1,000 sheets in the first condition. As a result, in the comparative example, the page order was changed 200 times and the marking was performed 20 times in the protection operation. In contrast, in the operation in Experiment 9, the page order was changed 50 times and marking was performed only at three positions in the protection operation. That is, it was confirmed that the frequency of the change of the page order is reduced, and the efficiency of the change is improved, and in turn, the process time was shortened with the operation of Experiment 9.

(Experiment 10)

In Experiment 10, the effectiveness of the operation of changing the page order by prioritizing a priority color was confirmed. As the condition of the experiment, Y was set to a first color having a largest coverage difference between the maximum coverage and the minimum coverage in the printing job, and M was set to a second color having the largest average coverage, and, a printing job of 10,000 sheets was performed using both of the first color and the second color as the priority color, without performing the protection operation. In addition, the coverage difference of Y was set to 30%, and the average coverage of M was set to 20%. In addition, as a comparative example, a similar printing job was performed by setting C which is a color different from the first color and the second color as the priority color. As a result, it was confirmed that, in the comparative example, the toner smear rate of Y was 3%, and streak lines of M were formed when the halftone toner image of each color was formed at the time of completion of the printing job. In contrast, it was confirmed that, when the page order was changed with Y as the priority color, the toner smear rate of Y was reduced to 1.5%. In addition, it was confirmed that no streak line of M was formed at the time of completion of the printing job when the page order was changed with M as the priority color.

What is claimed is:

1. An image forming apparatus comprising:
a determination section configured to determine whether there is a possibility of generation of an image defect during a printing job for image formation for a plurality of pages, the determination performed by the determination section based on image data included in the printing job, the printing job having an original page order in which a first page of the plurality of pages is ahead of a second page of the plurality of pages;
a changing section configured to change the original page order to a changed page order to be subjected to image formation such that an image defect is not generated, the change performed when the determination section determines that there is a possibility of generation of the image defect, wherein the original page order is changed by moving the second page ahead of the first page in the changed page order; and
an image forming section configured to execute image formation for the plurality of pages according to the changed page order such that an image for the second page is formed on a sheet before an image for the first page is formed on another sheet.

2. The image forming apparatus according to claim 1, wherein
the determination section determines whether there is a possibility of generation of an image defect based on a coverage of a toner in pages, and
the changing section changes the original page order to an order of lower coverage of the toner in the pages when the original page order is determined to be an order which possibly generates the image defect.

3. The image forming apparatus according to claim 1, wherein
the determination section determines whether there is a possibility of generation of an image defect based on a coverage of a toner in a sub-scanning direction at each position in a main scanning direction of pages, the sub-scanning direction being orthogonal to the main scanning direction, and
the changing section changes the original page order such that pages whose coverage of a toner in the sub-scanning direction is equal to or greater than an allowable amount are not successively operated when the original page order is determined to be an order which possibly generates the image defect.

4. The image forming apparatus according to claim 3, wherein
the determination section compares a first portion and a second portion, the first portion being a portion in which a coverage of a toner in the sub-scanning direction is equal to or greater than the allowable amount in one of the plurality of pages, the second portion being a portion in which a coverage of a toner in the sub-scanning direction is equal to or greater than the allowable amount in another one of the plurality of pages immediately preceding the page containing the first portion, and,
when a position of the first portion and a position of the second portion in the main scanning direction overlap, the determination section determines that the original page order is an order which possibly generates an image defect.

5. The image forming apparatus according to claim 1 further comprising:
a control section configured to perform an image formation process of the printing job based on the changed page order, wherein,
when a page whose order possibly generates the image defect is included in the changed page order, the control section performs a process of preventing generation of the image defect in a course of the image formation process in accordance with a number of pages whose order possibly generates the image defect.

6. The image forming apparatus according to claim 5, wherein the control section changes a condition for the process of preventing generation of the image defect in accordance with a use history of an image forming member used for image formation.

7. The image forming apparatus according to claim 5, wherein the control section changes a condition for the process of preventing generation of the image defect in accordance with a use history of a developer used for image formation.

8. The image forming apparatus according to claim 5, wherein
when a first printing job and a second printing job are input to the image forming apparatus, and there is no page whose order does not easily generate the image defect when the order of the pages is changed in the first printing job, the changing section uses a page which is to be subjected to an image formation process in the second printing job as a page whose order is to be changed.

9. The image forming apparatus according to claim 1, wherein
the determination section determines whether there is a possibility of generation of an image defect based on a coverage of a toner in pages and a coverage of a toner in a sub-scanning direction orthogonal to a main scanning direction at each position of the pages in the main scanning direction, and,
when the original page order is determined to be an order which possibly generates the image defect, the changing section changes the original page order to an order of lower coverage of the toner in the pages, and thereafter changes the order of the pages such that pages whose coverage of a toner in the sub-scanning direction is equal to or greater than an allowable amount are not successively operated.

10. The image forming apparatus according to claim 1 further comprising:
a plurality of image forming sections corresponding to colors different from each other, wherein
the determination section calculates a coverage difference between a page having a largest coverage and a page having a smallest coverage for each color in the printing job, and calculates an average coverage for each color in the printing job to determine a reference color for determination whether there is a possibility of generation of an image defect in accordance with the coverage difference and the average coverage.

11. The image forming apparatus according to claim 1, wherein the determination section determines whether there is a possibility of generation of an image defect based on a sheet width in a main scanning direction in the printing job, and, when the original page order is determined to be an order which possibly generates the image defect, the changing section changes the original page order to an order of greater width of the sheet in the main scanning direction.

12. The image forming apparatus according to claim 1 further comprising:

a control section configured to perform an image formation process of the printing job based on the changed page order; and an image defect detection section configured to detect the image defect in a sheet on which an image is formed, wherein the control section again performs an image formation process on a page on which the image defect is detected by the image defect detection section, and the changing section changes the order of the pages when again performing the image formation process.

13. The image forming apparatus according to claim 1 further comprising:

a control section configured to perform an image formation process of the printing job based on the changed page order; and the control section performs an operation of notifying a user that the original page order is changed when the original page order is changed by the changing section.

14. The image forming apparatus according to claim 1 further comprising:

a control section configured to perform an image formation process of the printing job based on the changed page order, wherein after the original page order is changed by the changing section and an image formation process is performed on sheets according to the changed page order, the control section resets the order of the sheets to the order of the original page order, and performs an ejection operation of the sheets according to the original page order.

15. A non-transitory computer-readable medium storing instructions, which when executed by a computer of an image forming apparatus, causes the image forming apparatus to execute a process comprising:

determining whether there is a possibility of generation of an image defect during a printing job for image formation for a plurality of pages, the determining performed based on image data included in the printing job, the printing job having an original page order in which a first page of the plurality of pages is ahead of a second page of the plurality of pages;

changing the original page order to a changed page order to be subjected to image formation such that the image defect is not generated, the changing performed when it is determined that there is a possibility of generation of the image defect, wherein the original page order is changed by moving the second page ahead of the first page in the changed page order; and executing image formation for the plurality of pages according to the changed page order such that an image for the second page is formed on a sheet before an image for the first page is formed on another sheet.

16. The non-transitory computer-readable medium of claim 15, wherein in the determining, whether there is a possibility of generation of an image defect is determined based on a coverage of a toner in pages, and in the changing, the original page order is changed to an order of lower coverage of the toner in the pages when the original page order is determined to be an order which possibly generates the image defect.

17. The non-transitory computer-readable medium of claim 15, wherein in the determining, whether there is a possibility of generation of an image defect is determined based on a coverage of a toner in a sub-scanning direction at each position in a main scanning direction of pages, the sub-scanning direction being orthogonal to the main scanning direction, and in the changing, the original page order is changed such that pages whose coverage of a toner in the sub-scanning direction is equal to or greater than an allowable amount are not successively operated when the original page order is determined to be an order which possibly generates the image defect.

18. The non-transitory computer-readable medium of claim 17, wherein in the determining, a first portion and a second portion are compared, the first portion being a portion in which a coverage of a toner in the sub-scanning direction is equal to or greater than the allowable amount in one of the plurality of pages, the second portion being a portion in which a coverage of a toner in the sub-scanning direction is equal to or greater than the allowable amount in another one of the plurality of pages immediately preceding the page containing the first portion, and when a position of the first portion and a position of the second portion in the main scanning direction overlap, it is determined that the original page order is an order which possibly generates an image defect.

19. The non-transitory computer-readable medium of claim 15, wherein the process executed by the image forming apparatus further comprises:

controlling an image formation process of the printing job based on the changed page order, and in the controlling, when a page whose order possibly generates the image defect is included in the changed page order, a process of preventing generation of the image defect is performed in a course of the image formation process in accordance with a number of pages whose order possibly generates the image defect.

20. The non-transitory computer-readable medium of claim 15, wherein in the determining, whether there is a possibility of generation of an image defect is determined based on a sheet width in a main scanning direction in the printing job, and in the changing, when the original page order is determined to be an order which possibly generates the image defect, the original page order is changed to an order of greater width of the sheet in the main scanning direction.

* * * * *